US011687534B2

(12) United States Patent
Shang et al.

(10) Patent No.: US 11,687,534 B2
(45) Date of Patent: Jun. 27, 2023

(54) METHOD AND SYSTEM FOR DETECTING SENSITIVE DATA

(71) Applicant: HUAWEI TECHNOLOGIES CO., LTD., Guangdong (CN)

(72) Inventors: Zhiwei Shang, Waterloo (CA); Zhijun Mo, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/350,549

(22) Filed: Jun. 17, 2021

(65) Prior Publication Data
US 2022/0405274 A1 Dec. 22, 2022

(51) Int. Cl.
*G06F 16/2455* (2019.01)
*G06F 21/62* (2013.01)

(52) U.S. Cl.
CPC ...... *G06F 16/2455* (2019.01); *G06F 21/6245* (2013.01)

(58) Field of Classification Search
CPC .......................... G06F 16/2455; G06F 21/6245
USPC ......................................................... 707/769
See application file for complete search history.

(56) References Cited

U.S. PATENT DOCUMENTS

| 5,963,942 A * | 10/1999 | Igata ................. G06F 16/90344 707/999.005 |
| 6,272,488 B1 * | 8/2001 | Chang ................... G06F 16/245 707/999.102 |
| 6,820,075 B2 * | 11/2004 | Shanahan ........... G06F 16/3322 707/769 |
| 7,370,034 B2 * | 5/2008 | Franciosa ............... G06F 16/93 707/750 |
| 7,752,222 B1 * | 7/2010 | Cierniak ............... G06F 16/951 707/769 |
| 7,805,392 B1 * | 9/2010 | Steele ................... G06F 21/564 706/48 |
| 8,176,004 B2 * | 5/2012 | Malaney ............... G06Q 10/00 709/219 |

(Continued)

FOREIGN PATENT DOCUMENTS

| CN | 103617251 A | 3/2014 |
| CN | 109614816 A | 4/2019 |

(Continued)

OTHER PUBLICATIONS

Thompson, "Programming Techniques: Regular expression search algorithm", Communications of the ACM, 11(6): 419-422, Jun. 1968.

(Continued)

*Primary Examiner* — Hanh B Thai
(74) *Attorney, Agent, or Firm* — BCF LLP

(57) ABSTRACT

The disclosed systems and methods are directed to detecting sensitive data on a computing device. This includes matching predetermined keywords in input data, to determine data in vicinities of matched keywords in the input data in which sensitive data is likely to be found, and matching predefined patterns associated with sensitive data to the data in vicinities of matched keywords to detect sensitive data. Matching the predetermined keywords occurs prior to matching the predefined patterns, and the data in vicinities of matched keywords is substantially shorter than the input data.

14 Claims, 5 Drawing Sheets

(56) References Cited

U.S. PATENT DOCUMENTS

| | | | | |
|---|---|---|---|---|
| 8,458,354 | B2* | 6/2013 | Bremler-Barr | H04L 67/02 709/231 |
| 8,838,616 | B2* | 9/2014 | Matsumura | G06F 16/3344 707/749 |
| 8,965,904 | B2* | 2/2015 | Dinh | G06F 16/338 707/705 |
| 9,203,623 | B1 | 12/2015 | Lin et al. | |
| 10,498,355 | B2* | 12/2019 | Hong | H03M 7/30 |
| 10,671,753 | B2* | 6/2020 | Allen | G06F 21/6263 |
| 10,678,795 | B2* | 6/2020 | Wulf | G06F 16/9535 |
| 10,922,345 | B2* | 2/2021 | Rogynskyy | G06N 3/08 |
| 11,265,388 | B2* | 3/2022 | Wulf | H04M 15/60 |
| 11,308,095 | B1* | 4/2022 | Arasan | G06F 16/2457 |
| 11,328,307 | B2* | 5/2022 | Venkatraman | G06Q 30/0185 |
| 11,343,337 | B2* | 5/2022 | Rogynskyy | G06F 16/219 |
| 2004/0030692 | A1* | 2/2004 | Leitermann | G06F 16/338 |
| 2004/0254929 | A1* | 12/2004 | Isaac | G01C 21/00 |
| 2007/0118391 | A1* | 5/2007 | Malaney | G06Q 10/00 382/229 |
| 2008/0147790 | A1* | 6/2008 | Malaney | G06Q 10/00 709/203 |
| 2009/0063557 | A1* | 3/2009 | MacPherson | G06N 5/02 |
| 2009/0094213 | A1* | 4/2009 | Wang | G06F 16/9535 |
| 2010/0076919 | A1* | 3/2010 | Chen | H04L 12/56 706/46 |
| 2010/0153440 | A1* | 6/2010 | Hubert | G06Q 30/0601 707/769 |
| 2011/0185077 | A1* | 7/2011 | Bremler-Barr | H03M 7/3086 709/231 |
| 2011/0252030 | A1* | 10/2011 | Spangler | G06F 16/334 707/E17.084 |
| 2013/0124534 | A1* | 5/2013 | Dinh | G06F 16/338 707/E17.083 |
| 2014/0236953 | A1* | 8/2014 | Rapaport | G06Q 30/02 707/740 |
| 2015/0356173 | A1* | 12/2015 | Aikawa | G06F 16/3344 707/722 |
| 2016/0253679 | A1* | 9/2016 | Venkatraman | G06Q 30/0185 705/310 |
| 2017/0038916 | A1* | 2/2017 | Beach | G06F 16/9535 |
| 2017/0235799 | A1* | 8/2017 | Miller | G06F 16/332 707/722 |
| 2017/0374093 | A1* | 12/2017 | Dhar | G06Q 50/265 |
| 2018/0232528 | A1* | 8/2018 | Williamson | G06N 5/025 |
| 2018/0276401 | A1* | 9/2018 | Allen | G06F 21/6245 |
| 2018/0276402 | A1* | 9/2018 | Allen | G06F 21/6263 |
| 2019/0268379 | A1* | 8/2019 | Narayanaswamy | H04L 63/0245 |
| 2019/0354715 | A1* | 11/2019 | Allen | G06F 21/6245 |
| 2020/0145463 | A1* | 5/2020 | Narayanaswamy | H04L 63/12 |
| 2021/0058395 | A1* | 2/2021 | Jakobsson | H04L 67/306 |
| 2022/0179991 | A1* | 6/2022 | Jha | G06F 11/3065 |

FOREIGN PATENT DOCUMENTS

| | | |
|---|---|---|
| CN | 110580416 A | 12/2019 |
| CN | 113051601 A | 6/2021 |

OTHER PUBLICATIONS

Aho et al., "Efficient string matching: An aid to bibliographic search", Communications of the ACM, 18 (6): 333-340, Jun. 1975.

Karp et al., "Efficient randomized pattern-matching algorithms", IBM Journal of Research and Development, 31 (2): 249-260, Mar. 1987.

Github, Presidio: Data Protection and Anonymization SDK, retrieved from https://github.com/microsoft/presidio/blob/main/docs/index.md on Jun. 18, 2021.

Github, Presidio design, retrieved from https://github.com/microsoft/presidio/blob/main/docs/design.md on Jun. 18, 2021.

International Search Report and Written Opinion of PCT/CN2022/090617; Tianqi Zhao; dated Jul. 27, 2022.

* cited by examiner

METHOD AND SYSTEM FOR DETECTING SENSITIVE DATA

CROSS-REFERENCE TO RELATED APPLICATIONS

This is the first filing related to the disclosed technology. At the time of filing, there are no related patents or applications.

TECHNICAL FIELD

The present disclosure relates generally to the field of computer data security, and more particularly to methods and systems for detecting sensitive data in free text and/or other digital media.

BACKGROUND

Data can be categorized into three classes: structured data, semi-structured data, and unstructured data. The term "structured data" usually refers to database data that are clearly and strictly organized, such that it is easy to identify which row/column/table is storing which type of information. "Semi-structured data" usually refers to data that has some structure, which is either not clear or not easy to identify. Examples of semi-structured data are html, email, and log data. "Unstructured data" refers to data that are organized in arbitrary ways. Free text and media data are typical examples of unstructured data.

Data may also be categorized according to sensitivity or degree of privacy or confidentiality. For purposes of explanation, this disclosure shall generally focus upon sensitive data. Sensitive data include, without limitation, data such as: financial data, including debit and credit card details; personal data, such as names, addresses, social insurance numbers, passport numbers, and/or any other information that may identify an individual; medical information, including information on medical conditions, medical insurance claims, genetic information, and other health-related information; education information, such as grades or other indications of educational performance; company-owned information, such as trade secrets and other intellectual property; and many other types of information. In general, sensitive data includes any data that, if released publicly, could cause financial loss or legal liability to the company or other organization that holds the information. In many instances, laws and regulations may dictate penalties for release of sensitive data. Such laws and regulations are becoming increasingly common throughout the world.

Sensitive data can include structured data, semi-structured data, and unstructured data. For structured data, it is usually straightforward to identify database rows, columns, and/or tables that may contain sensitive data, and to sanitize any sensitive data (e.g., by removing, masking, or anonymizing the data) prior to providing access. For unstructured data and some semi-structured data, however, it can be more difficult to identify the sensitive data that may be included in the unstructured or semi-structured data. For these types of data, the first step in sanitizing the data is to detect the presence and positions of the sensitive data in the unstructured or semi-structured data.

In many instances, structured and semi-structured data including sensitive data may be stored in files, often as text. For unstructured data and some portions of semi-structured data, these files may include substantial amounts of free-form text (also referred to as "free text"). In such instances, sensitive data detection will generally involve sensitive text detection.

At present, state-of-the-art sensitive text detection tools, such as PRESIDIO, by Microsoft corporation of Redmond, Wash., define separate "recognizers" for each type of sensitive data that is to be detected. For example, there may be a recognizer for credit card numbers, a recognizer for social insurance numbers, a recognizer for address information, etc. Such a system may include hundreds of recognizers for various types of sensitive information.

Unfortunately, these recognizers are typically invoked one-by-one (though parallelization may be possible), making the time complexity of such systems proportional to the number of recognizers. Thus, a system detecting 50 different types of sensitive data may be ten times slower than a system detecting only five different types of sensitive data. This may be particularly problematic when hundreds of different types of sensitive data are being detected.

SUMMARY

To address the problems discussed above, the present disclosure applies an efficient text searching algorithm, such as the Aho-Corasick algorithm, to searching for keywords that may indicate the presence of sensitive data in free text, and provides an arrangement of a detection pipeline that provides substantial efficiency gains in automated sensitive data detection. Using the disclosed technology, it is anticipated that the detection time complexity will be independent of the number of types of sensitive data to be detected. This may substantially improve the speed, scalability, and efficiency of systems that process large amounts of text for detecting sensitive data, improving the functioning of computing devices that perform such detection.

It will be understood that although the disclosed technology is described as applied to detection of sensitive data inside free text, other uses are also possible. Similar methods and systems could be used, for example to detect sensitive data inside of images, audio, video, and other types of digital media.

In accordance with one aspect of the present disclosure, the technology is implemented in an apparatus including a processor, a memory coupled to the processor, and a sensitive data detector in the memory and executed by the processor. The sensitive data detector includes: a keyword matcher that matches predetermined keywords in input text, and determines text in vicinities of matched keywords in the input text in which sensitive data is likely to be found; and a pattern matcher that matches predefined patterns associated with sensitive data to the text in vicinities of matched keywords to detect sensitive data. The keyword matcher executes prior to the pattern matcher, and the text in vicinities of matched keywords is substantially shorter in length than the input text.

In some implementations, the sensitive data detector further includes a validator that validates the sensitive data detected by the pattern matcher. In some of these implementations, the validator uses a validation function specific to a detected type of sensitive data to validate the sensitive data detected by the pattern matcher. In some implementations, the validation function comprises includes a checksum.

In some implementations the keyword matcher has a time complexity that does not depend on how many predetermined keywords are to be matched. In some of these implementations, the keyword matcher uses a pre-constructed Aho-Corasick automaton configured to match the predetermined keywords in a single pass over the input text.

In some implementations, the predefined patterns include regular expressions. In some implementations, the pattern matcher includes a regular expression matching algorithm.

In some implementations, at least one of the keyword matcher or the pattern matcher comprises at least one of pre-processing or post-processing.

In accordance with another aspect of the present disclosure, a method of detecting sensitive data on a computing device is provided. The method includes: matching, on the computing device, predetermined keywords in input data, to determine data in vicinities of matched keywords in the input data in which sensitive data is likely to be found; and matching, on the computing device, predefined patterns associated with sensitive data to the data in vicinities of matched keywords to detect sensitive data. Matching the predetermined keywords occurs prior to matching the predefined patterns, and the data in vicinities of matched keywords is substantially shorter than the input data.

In some implementations, the method further includes validating the detected sensitive data. In some of these implementations, validating the detected sensitive data includes applying a validation function specific to a detected type of sensitive data to the detected sensitive data. In some implementations, applying the validation function includes calculating a checksum.

In some implementations, matching the predetermined keywords has a time complexity that does not depend on how many predetermined keywords are to be matched. In some implementations, matching the predetermined keywords includes using a pre-constructed Aho-Corasick automaton configured to match the predetermined keywords in a single pass over the input data. In some implementations, the method further includes assembling a list of keywords that frequently co-occur with sensitive data for sensitive data types that are to be detected, and constructing a single Aho-Corasick automaton that detects the keywords in the list of keywords. In some implementations, assembling the list of keywords comprises assembling the list of keywords using keywords from a plurality of virtual detectors, each virtual detector in the plurality of virtual detectors including at least one keyword associated with at least one sensitive data type.

In some implementations, matching the predefined patterns includes matching regular expressions. In some implementations at least one of matching the predetermined keywords or matching the predefined patterns includes applying at least one of pre-processing or post-processing. In some implementations, the input data includes at least one of text, video, audio, or images.

BRIEF DESCRIPTION OF THE FIGURES

The features and advantages of the present disclosure will become apparent from the following detailed description, taken in combination with the appended drawings, in which.

Figure 1:
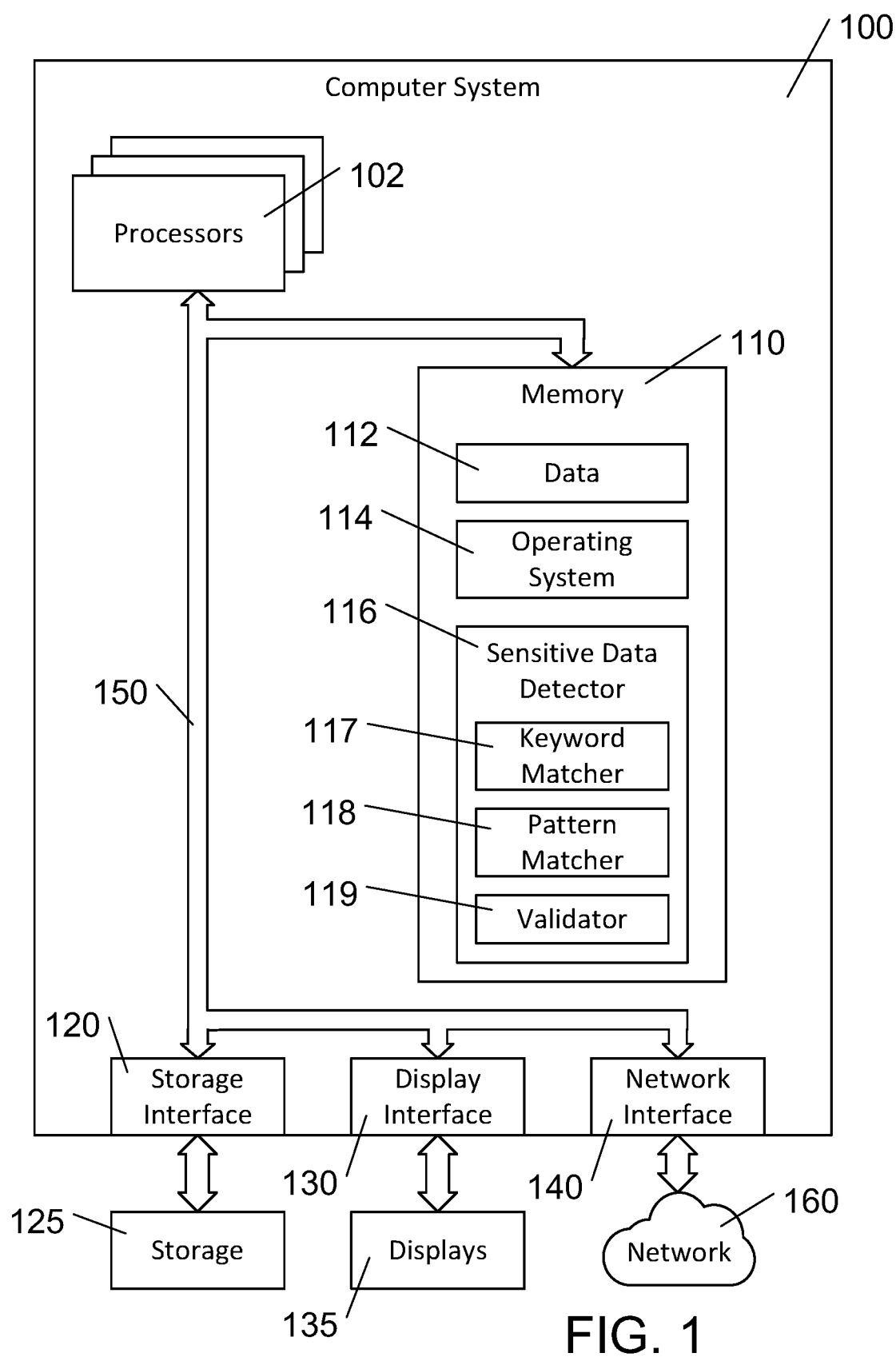
FIG. 1 is a block diagram of a computer system including an implementation of a sensitive data detector in accordance with the disclosed technology.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments of the disclosed technology will be described more fully hereinafter with reference to the accompanying drawings. The present technology may, however, be embodied in many different forms and should not be construed as limited to the representative embodiments set forth herein. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Additionally, it will be understood that elements may be "coupled" or "connected" mechanically, electrically, communicatively, wirelessly, optically, and so on, depending on the type and nature of the elements that are being coupled or connected.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing instructions, in association with appropriate software instructions. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities. It will further be understood that a "module" generally defines a logical grouping or organization of related software code or other elements as discussed above, associated with a defined function. Thus, one of ordinary skill in the relevant arts will understand that particular code or elements that are described as being part of a "module" may be placed in other modules in some implementations, depending on the logical organization of the software code or other elements, and that such modifications are within the scope of the disclosure as defined by the claims.

It should also be noted that as used herein, the term "optimize" means to improve. It is not used to convey that the technology produces the objectively "best" solution, but rather that an improved solution is produced. In the context of memory access, it typically means that the efficiency or speed of memory access may be improved.

As used herein, the term "determine" generally means to make a direct or indirect calculation, computation, decision, finding, measurement, or detection. In some cases, such a determination may be approximate. Thus, determining a value indicates that the value or an approximation of the value is directly or indirectly calculated, computed, decided upon, found, measured, detected, etc. If an item is "predetermined" it is determined at any time prior to the instant at which it is indicated to be "predetermined."

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in each computing/processing device may receive computer-readable program instructions via the network and forwards the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable program instructions. These computer-readable program instructions may be provided to a processor or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to produce a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

FIG. 1 shows an illustrative computer system 100 that includes a sensitive data detector 116, as described in greater detail below. As will be understood by one of ordinary skill in the art, a sensitive data detector, such as the sensitive data detector 116, is generally a computer program that detects the presence and locations of sensitive data within a data file or data stream. Typically, such a sensitive data detector will be configured to detect numerous types of sensitive data, such as credit card numbers, social insurance numbers, passport numbers, names, addresses, medical information, and so on. In a typical sensitive data detection system, the sensitive data detector may be configured to detect hundreds of different types of sensitive information. Following detection of such sensitive information, the computer system 100 may apply modules (not shown) for sanitizing the data by, e.g., removing, masking, and/or anonymizing the sensitive data prior to providing access to the data.

The computer system 100 may be a multi-user server or computer, a single user computer, a laptop computer, a tablet computer, a smartphone, an embedded control system, a network gateway or router, or any other computer system currently known or later developed. As shown in FIG. 1, the computer system 100 includes one or more processors 102, a memory 110, a storage interface 120, a display interface 130, and a network interface 140. These system components are interconnected via a bus 150.

The memory 110 may contain data 112, an operating system 114, and a sensitive data detector 116. The data 112 may be any data that serves as input to or output from any program in the computer system 100. The operating system 114 is an operating system such as MICROSOFT WINDOWS or LINUX. The sensitive data detector 116 includes a keyword matcher 117, which matches keywords (e.g., finds like or corresponding keywords) that may indicate the presence of sensitive data, a pattern matcher 118, which matches patterns associated with sensitive data, and a validator 119, which uses techniques such as checksums, which may be associated with particular types of sensitive data to validate the identification of sensitive data. It will be understood by those of ordinary skill in the art that although the sensitive data detector 116 is shown as executing on the computer system 100, it is possible that the sensitive data detector 116 could execute on numerous computer systems, connected, e.g., by a network. Further, the keyword matcher 117, pattern matcher 118, and validator 119 may reside on different computer systems.

The storage interface 120 is used to connect storage devices, such as the storage device 125, to the computer system 100. One type of storage device 125 is a solid-state drive, which may use an integrated circuit assembly to store data persistently. A different kind of storage device 125 is a hard drive, such as an electro-mechanical device that uses magnetic storage to store and retrieve digital data. Similarly, the storage device 125 may be an optical drive, a card reader that receives a removable memory card, such as an SD card, or a flash memory device that may be connected to the computer system 100 through, e.g., a universal serial bus (USB).

In some implementations, the computer system 100 may use well-known virtual memory techniques that allow the programs of the computer system 100 to behave as if they have access to a large, contiguous address space instead of access to multiple, smaller storage spaces, such as the memory 110 and the storage device 125. Therefore, while the data 112, the operating system 114, and the sensitive data detector 116 are shown to reside in the memory 110, those skilled in the art will recognize that these items are not necessarily wholly contained in the memory 110 at the same time.

The processors 102 may include one or more microprocessors and/or other integrated circuits. The processors 102 execute program instructions stored in the memory 110. When the computer system 100 starts up, the processors 102 may initially execute a boot routine and/or the program instructions that make up the operating system 114. The processors 102 may also execute instructions that make up the sensitive data detector 116.

The display interface 130 is used to connect one or more displays 135 to the computer system 100. These displays 135, which may include, e.g., terminals, monitors, keyboards, pointer devices, touchscreens, and/or other human interface devices, provide the ability for users to interact with the computer system 100. Note, however, that although the display interface 130 is provided to support communication with one or more displays 135, the computer system 100 does not necessarily require a display 135, because all needed interaction with users may occur via the network interface 140.

The network interface 140 is used to connect the computer system 100 to other computer systems or networked devices (not shown) via a network 160. The network interface 140 may include a combination of hardware and software that allows communicating on the network 160. The software in the network interface 140 may include software that uses one or more network protocols to communicate over the network 160. For example, the network protocols may include TCP/IP (Transmission Control Protocol/Internet Protocol). In some implementations, the network interface 140 may be an Ethernet adapter.

It will be understood that the computer system 100 is merely an example and that the compiler and optimizer according to the disclosed technology may execute on computer systems or other computing devices having different configurations.

Figure 2:
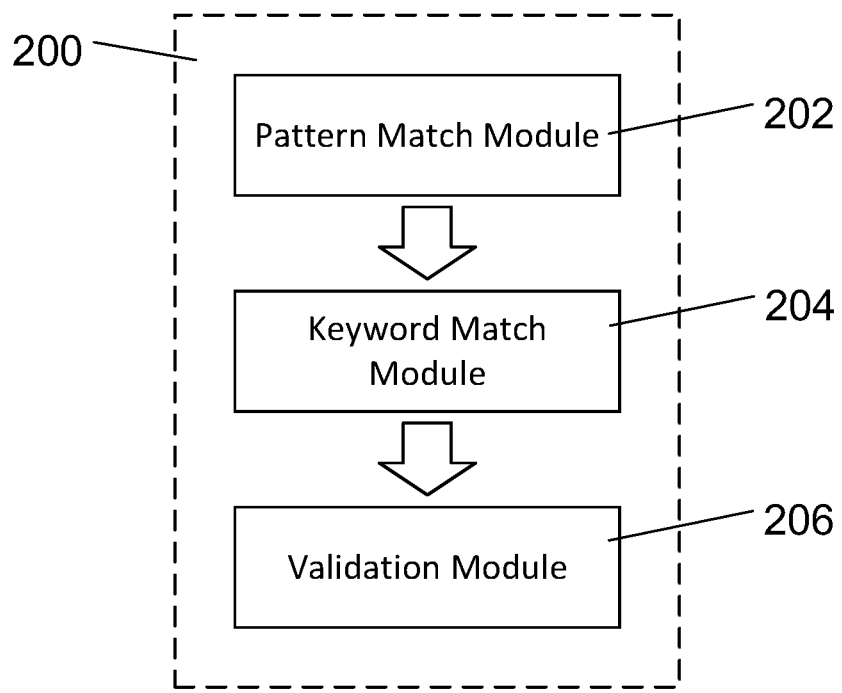
FIG. 2 shows a block diagram of a conventional (prior art) system for detecting sensitive data.

FIG. 2 shows a block diagram of a conventional system 200 for detecting sensitive data. The system includes a pattern match module 202, a keyword match module 204, and a validation module 206.

As can be seen, the first module that is applied to a free text stream or file is the pattern match module 202. The pattern match module 202 typically matches the text to regular expressions to find patterns indicative of sensitive data. A regular expression (or "regex") is a sequence of characters that specifies a search pattern. Some simple examples include "a*" to match zero or more "a" characters, "a+" to match one or more "a" characters, "[ab]*c+" to match zero or more "a" or "b" characters followed by one or more "c" characters, and "generali[sz]e" matches "generalise" or "generalize". Regular expressions have been known since the 1950s, and are commonly used in string searching. Regular expressions and algorithms for matching regular expressions will be well-understood by one of ordinary skill in the art.

Regular expression matching is computationally expensive. One common algorithm for regular expression matching, commonly known as Thompson's construction algorithm (see Thompson, K., "Programming Techniques: Regular expression search algorithm", *Communications of the ACM,* 11(6): 419-422, June 1968) takes time proportional to mn, where n is the number of characters in the stream or file, and m is the length of the regular expression being matched. If there is a fixed set of regular expressions for each sensitive data type, then either by searching for all of the regular expressions for all of the sensitive data types in one pass, or by invoking the pattern matching module 202 for each sensitive data type, the overall time complexity will be linear in the number of sensitive data types.

The keyword match module 204 searches text in the vicinity of the regular expressions matched by the pattern match module for keywords associated with each type of sensitive data to add to the certainty that sensitive information of a particular type has been found. Each type of sensitive data may be associated with particular keywords and finding these keywords in text near the identified patterns helps to verify the presence of the type of sensitive data associated with those keywords.

It will be understood that there are many known algorithms for searching for keywords in text. A naïve approach, which involves checking for the presence of each keyword at each position in the text being searched, will result in a time complexity of kn, where k is the length of the keywords, and n is the length of the text being searched. If such an approach is used, then, as with the pattern match module 202, the time complexity will be linear in the number of sensitive data types, assuming that each sensitive data type is associated with a fixed set of keywords.

There are other well-known algorithms for performing keyword searches that provide much better performance than the naïve approach. These include, for example, the Aho-Corasick algorithm (see Aho, A. and Corasick, M., "Efficient string matching: An aid to bibliographic search", *Communications of the ACM,* 18 (6): 333-340, June 1975) and the Rabin-Karp algorithm (see Karp, R. and Rabin, M., "Efficient randomized pattern-matching algorithms", *IBM Journal of Research and Development,* 31 (2): 249-260, March 1987), to name just a couple of the best-known such algorithms. Except in certain degenerate cases (such as when every substring is a match for the keyword in the Aho-Corasick algorithm), these algorithms tend to have a time complexity proportional to n+k, where n is the length of the string being searched, and k is the length of the keywords, or faster (e.g., time complexity proportional to n) when the list of keywords is known in advance, such that setup for the search (e.g., such as construction of an Aho-Corasick automaton) can be done offline, prior to the search itself.

In practice, however, for the conventional sensitive data detection system 200, use of these more efficient algorithms does not make much difference in overall performance. This is because the length of the text to be searched is substantially (non-trivially) shortened by the pattern match module 202, so the only text that needs to be searched is the text in the immediate vicinity of the matched patterns or regular expressions. This means that n—the length of the text to be searched—will be relatively small, so the keyword matching algorithm used in the keyword match module 204 is likely to be fast enough, even if the algorithm is not particularly efficient. Indeed, because the size of the text to be processed is likely to greatly decrease as a result of the pattern match module 202, the time taken by the pattern match module 202 will typically dominate the overall time taken by the conventional sensitive data detection system 200, with the time taken by the keyword match module 204 and the validation module 206 being practically insignificant in comparison. For this reason, conventional sensitive data detectors have typically not employed particularly efficient keyword matching algorithms.

The validation module 206 validates the correctness of the sensitive data that has been identified by the pattern match module 202 and that is associated with appropriate keywords for a sensitive data type, as determined by the keyword match module 204. The validation module 206 applies additional validation functions, such as checksums or other tests that may be dependent on the sensitive data type, to further validate the presence of sensitive data. This reduces the false positive rate of the conventional sensitive data detection system 200.

Because each sensitive data type may have its own validation function, it is difficult to characterize the time complexity of the validation module 206. It will be understood that there may be some sensitive data types for which there is no validation function. Additionally, it will be understood that use of the validation module 206 may be optional, and that use of the pattern match module 202 and keyword match module 204 may provide adequate results without further validation in some use cases.

Figure 3:
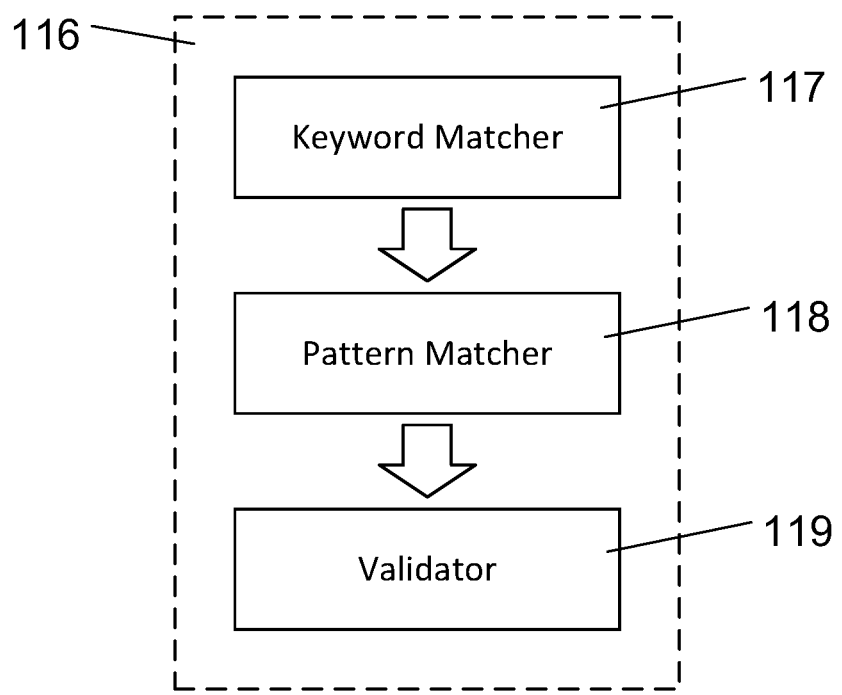
FIG. 3 shows a block diagram of a sensitive data detector in accordance with various implementations of the disclosed technology.

FIG. 3 shows a block diagram of a sensitive data detector 116 in accordance with some implementations of the disclosed technology. The sensitive data detector 116 includes a keyword matcher 117, a pattern matcher 118, and an optional validator 119. The sensitive data detector 116 takes a long string of text, such as a free text stream or file that may contain sensitive data as input and produces as output a list of positions (e.g., as a start index and end index within the input string) at which sensitive data occurs, and a corresponding list of labels, identifying the type of the sensitive data detected in each of these positions.

The keyword matcher 117 finds keywords in the input text that may indicate the presence of sensitive data. In accordance with various implementations of the technology, the keyword matcher 117 uses an efficient keyword matching algorithm to find keywords associated with all of the sensitive data types to be detected. This identifies possible ranges or portions of the input text in the vicinity of the keywords, in which sensitive data is likely to be found (in other words, vicinity typically indicates proximity, but the degree of proximity in which sensitive data is likely to be found may be dependent upon factors such as the types of sensitive data), along with the sensitive data type associated with the keywords that were found in these ranges or portions of the input text.

Because the keyword matcher 117 is the first stage of the sensitive data detector 116, use of an efficient keyword matching algorithm may provide a significant performance gain relative to the conventional sensitive data detection system 200 described above with reference to FIG. 2. For example, by using the Aho-Corasick algorithm with a pre-built Aho-Corasick automaton for all keywords, the keyword matcher 117 may achieve a time complexity for the keyword search that is proportional to n+o, where n is the length of the input text and o is the number of output matches. In most cases, the number of output matches is expected to be much lower than the length of the input text, making the time complexity of the algorithm essentially linear in the length of the input text. In theory, in certain degenerate cases, there could be a quadratic number of output matches, o. While theoretically possible, such cases are not expected to occur in this application of the Aho-Corasick algorithm.

As will be understood by one of ordinary skill in the art, the Aho-Corasick algorithm is a well-known string searching algorithm, known since the 1970s, which locates all occurrences of any of a finite number of keywords in a string. While one of ordinary skill in the art would understand the Aho-Corasick algorithm and the process of constructing an Aho-Corasick automaton, a brief overview is provided here. The Aho-Corasick algorithm constructs a finite state automaton (referred to as an "Aho-Corasick automaton") to find keywords in an input string in a single pass. The Aho-Corasick algorithm constructs this finite state machine in three stages, which are commonly referred to as the "go-to" stage, the "failure" stage, and the "output" stage. In the go-to stage, a keyword tree (referred to as a "trie") is constructed for the set of keywords. In this context, the trie is a tree in which the root is associated with an empty string, each node in the tree represents a state in a finite state automaton, and the edges represent transitions that occur when a single character is read from the input string. The children of any node in the tree have a common prefix, namely the string associated with that node, and each leaf node represents a keyword. In the failure stage, state transitions are added for the longest suffix of the string that is also the prefix on some other node, so that input characters will not need to be scanned more than once. In the output stage the end state for a keyword is linked to end states for other keywords that are proper suffixes of the keyword (e.g., the end state for the keyword "she" would be linked to the end state for the keyword "he"). Once such an Aho-Corasick automaton is constructed, searching an input string for all of the keywords may be performed by traversing the Aho-Corasick automaton.

Advantageously, for implementations using a pre-built Aho-Corasick automaton, the time complexity of the search performed by the keyword matcher 117 does not depend on the number of keywords or on the number of sensitive data types that are being detected. Consequently, for embodiments using the Aho-Corasick algorithm, the sensitive data detector 116 will be scalable to detecting large numbers of sensitive data types without significant degradation in performance.

In accordance with various implementations, the keyword matcher 117 is applied to the input string before the pattern matcher 118. The keyword matcher 117 is, therefore, the only part of the sensitive data detector 116 that processes the entire input string. The pattern matcher 118 process the portions of the input string that have been identified by the keyword matcher 117 as potentially including sensitive data—i.e., those portions of the input string that are in the vicinity of keywords that are associated with sensitive data. Because this text will be much shorter than the entire input text, the computationally costly pattern matcher 118 will not have a great effect on the overall execution time of the sensitive data detector 116, which will instead be dominated by the execution time of the relatively efficient keyword matcher 117. Placing an efficient keyword matcher at the beginning of a sensitive data detection process may lead to significant efficiency gains in the overall process with no difference in accuracy of sensitive data detection.

The pattern matcher 118 matches the portions of the input text that are in the vicinity of the keywords, as determined by the keyword matcher 117, to predefined patterns associated with the sensitive data types that are being detected. Because the keyword matcher has already identified the type of sensitive data that may be in each portion if the input text, the pattern matcher 118 may apply only the patterns associated with the sensitive data type identified by the keyword matcher 117 to each portion of the text. In some embodiments, the patterns may be specified as predetermined regular expressions. The output of the pattern matcher 118 is a list of positions in the input text that match the predefined patterns, along with information on which sensitive data types were detected in these positions.

If regular expressions are used for matching patterns in the pattern matcher 118, then, as explained above, the time complexity of the pattern matcher 118 will be proportional to mn, where n is the number of characters in the text, and m is the length of the regular expressions being matched. While this is computationally expensive (at least compared to, e.g., keyword matching), because the keyword matcher 117 has already dramatically reduced the amount of text to just the portions of the input text that are in the vicinity of the keywords, n is relatively small. Additionally, because the sensitive data type that may be found in each portion of the text has already been identified by the keyword matcher 117, fewer regular expressions are applied to each portion of text. This may dramatically reduce m. Because the length of the text is much smaller than the length of the input text, and the number (and therefore the total length) of regular expressions that are applied to each portion of text may also be greatly reduced, the pattern matcher 118 executes in an efficient manner, and does not take much time to execute. In practical terms, the keyword matcher 117 dominates the execution time of the sensitive data detector 116, and the execution time of the pattern matcher 118 is small in comparison.

The validator 119 validates the correctness of the sensitive data that has been identified by the pattern matcher 118. The validator 119 applies additional validation functions, such as checksums or other tests that may be dependent on the sensitive data type, to further validate the presence of sensitive data. In some implementations, only the text that pass the validation functions will be reported as sensitive data, to reduces the false positive rate.

Because each sensitive data type may have its own validation function, it is difficult to characterize the time complexity of the validator 119, except to say that because the amount of text to which it is applied is relatively small, it is expected that its execution time will be small in comparison to the execution time of the keyword matcher 117. It will be understood that in some implementations, there may be some sensitive data types for which there is no validation function. Additionally, it will be understood that in some implementations, use of the validator 119 may be optional.

It will be understood that in some implementations, optional pre-processing (not shown) may be performed on the input text prior to providing the input text to the sensitive data detector 116. Additionally, there may be optional pre- and/or post-processing (not shown) for each of the keyword matcher 117, the pattern matcher 118, and the validator 119.

Figure 4:
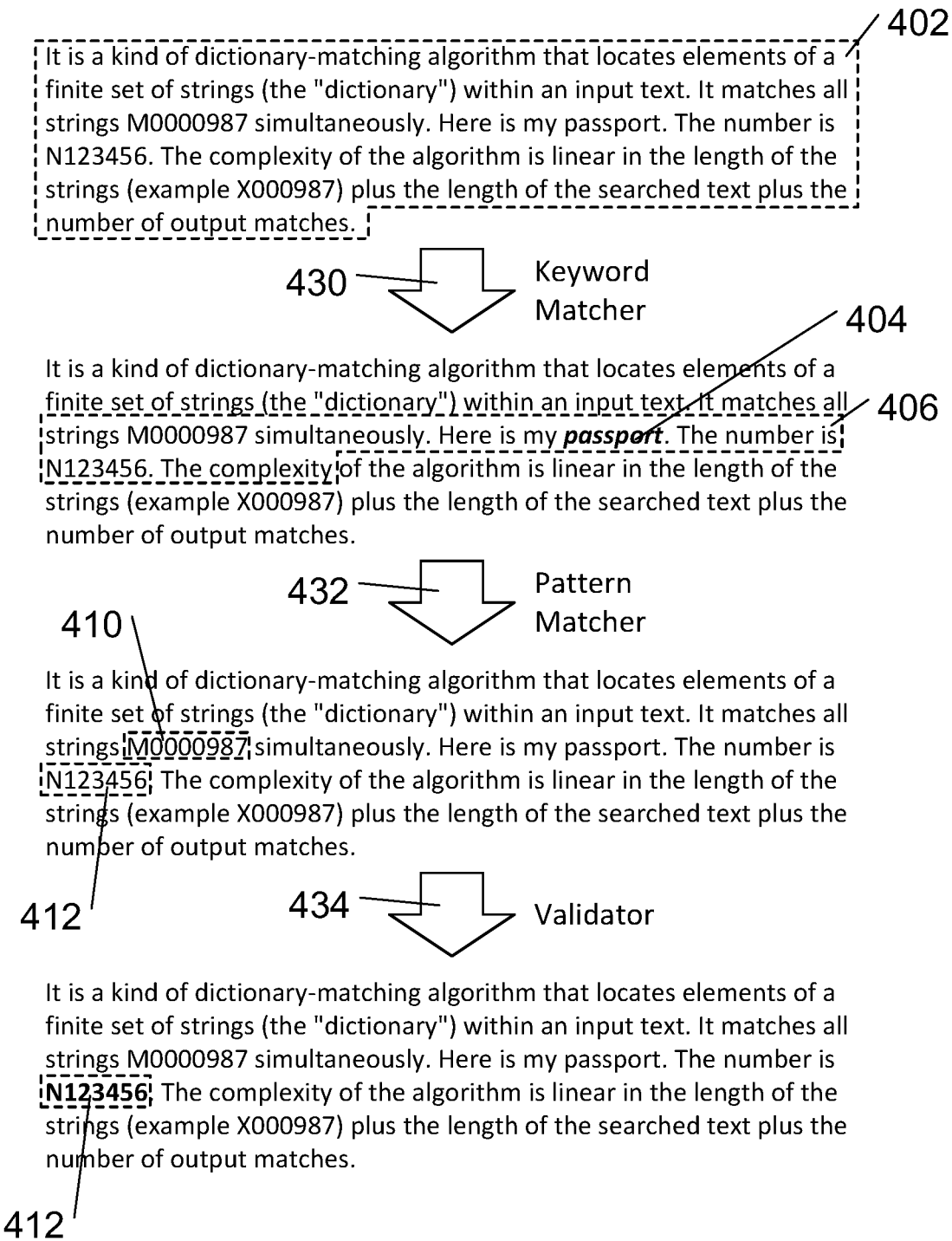
FIG. 4 shows an example application of a sensitive data detector in accordance with various implementations of the disclosed technology.

FIG. 4 shows an example application of a sensitive data detector in accordance with implementations of the disclosed technology. The input text 402 in this example is short, including only a few hundred characters. In practice, it is expected that the input text streams or files may include billions of characters. Additionally, for purposes of illustration, the example shown in FIG. 4 is searching for only a single sensitive data type—passport numbers. In practice, as discussed above, it is expected that the sensitive data detector 116 may search for hundreds of sensitive data types.

As shown in the example in FIG. 4, the input text 402 is passed through the keyword matcher 430, which finds a keyword 404 ("passport") and identifies text 406 in the vicinity of the keyword 404 for further processing. Additionally, the text 406 is marked (not shown) as potentially including sensitive data of the "passport number" sensitive data type. The text 406 includes six words before the keyword 404 and six words after the keyword 404, and includes only 91 characters (down from 388 characters in the input text 402). It will be understood that this determination of the vicinity of a keyword is used only for illustration, and there are many other ways of defining the vicinity of a keyword. Additionally, it will be recognized that the reduction in length between the input text and the text in the vicinity of the keywords will generally be far greater than is shown in this example.

Next, the text 406 is passed through the pattern matcher 432, which searches for words that match an example pattern of a word having a first upper-case letter, followed by one or more digits. This pattern could be represented, for example, as a regular expression of the form "\<[A-Z][0-9]+\>", where "\<" represents the start of a word and "\>" represents the end of a word. Searching for matches to this pattern in the text 406 results in matches 410 and 412, each of which is marked as potentially including sensitive data of the "passport number" sensitive data type. The total length of these two matches is 15 characters.

Next, the matches 410 and 412 pass through the validator 434, which determines, using a validation function for passport numbers, that the match 410 is not a passport number, but the match 412 is a passport number. Accordingly, the sensitive data detector will identify the range of characters of the input text 402 containing the word "N123456" as sensitive data of the "passport number" sensitive data type. Once this sensitive data has been identified, the system may then sanitize the sensitive text, by masking, removing, anonymizing, or otherwise making the original sensitive data unavailable.

Figure 5:
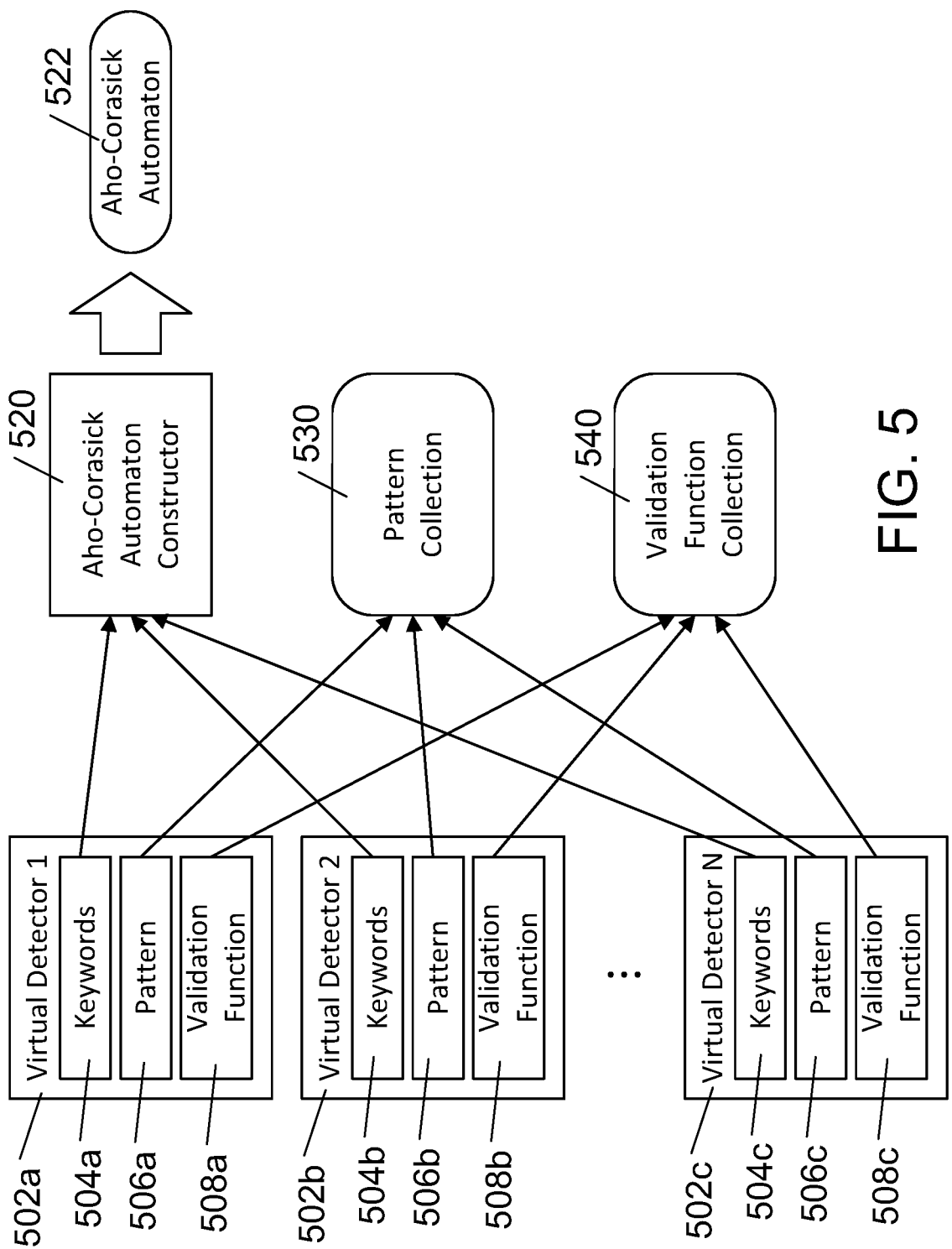
FIG. 5 shows a block diagram of a setup procedure for a sensitive data detector in accordance with various implementations of the disclosed technology.

FIG. 5 shows a block diagram of a setup procedure for a sensitive data detector in accordance with various implementations of the disclosed technology. This procedure may be performed "offline", prior to use of the sensitive data detector. For example, this procedure may be performed on a system different from the system in which the sensitive data detector is used.

For each type of sensitive data that is to be detected, a virtual detector, such as virtual detectors 502a, 502b, and 502c is provided. Each of these virtual detectors includes a set of keywords 504a-504c associated with the sensitive data type, a pattern 506a-506c (e.g., in the form of a regular expression) for the sensitive data type, and an optional validation function 508a-508c for validating the sensitive data type. The keywords 504a-504c for all of the sensitive data types are collected together in an Aho-Corasick automaton constructor 520 that uses well-known techniques, such as are briefly described above, to construct a single Aho-Corasick automaton 522 for detecting all of the keywords. This Aho-Corasick automaton 522 is then provided to the keyword matcher (not shown in FIG. 5) to detect all keywords. The patterns 506a-506c for all the sensitive data types are gathered to form a pattern collection 530, which is provided to the pattern matcher (not shown in FIG. 5). The validation functions 508a-508c for all the sensitive data types that have a validation function are gathered to form a validation function collection 540, which is provided to the validator (not shown in FIG. 5)

Figure 6:
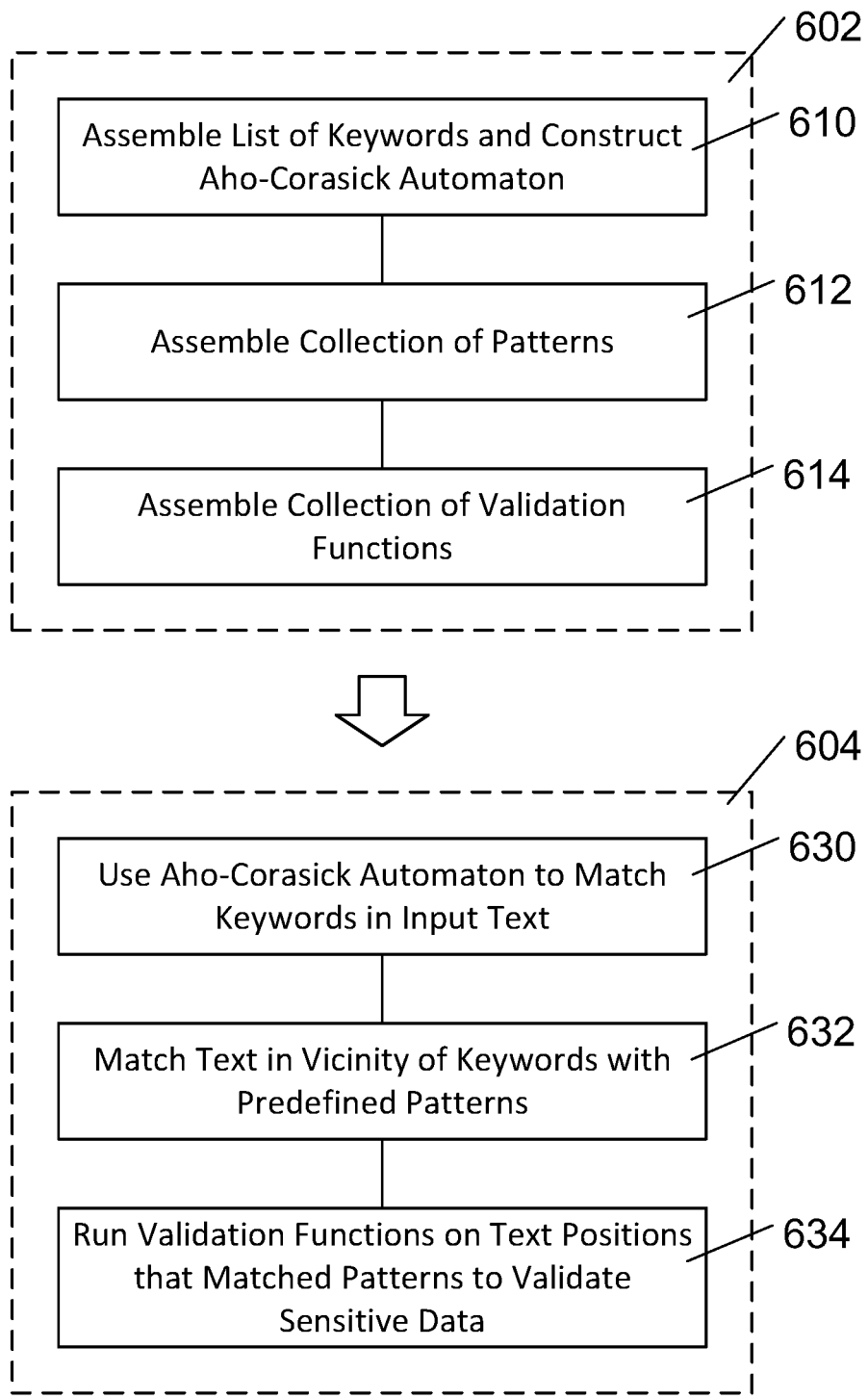
FIG. 6 shown a flowchart of a method for detecting sensitive data in accordance with various implementations of the disclosed technology.

FIG. 6 shows a flowchart of a method for detecting sensitive data in accordance with various implementations of the disclosed technology. The method includes a setup portion 602, and a detection portion 604.

The setup portion 602 prepares the information on the sensitive data types that are to be detected by the detection portion 604. The setup portion 602 may be performed on a different system than the detection portion 604 and need only be executed when the set of sensitive data types to be detected changes. The input to the setup portion 602 includes the keywords, patterns, and (optional) validation functions for the sensitive data types that are to be detected. In some implementations this input may be provided as a set of "virtual detectors," with one such virtual detector for each sensitive data type.

At 610, a list of keywords that frequently co-occur with sensitive data is assembled for all of the sensitive data types that are to be detected. In some implementations, these keywords are used to construct a single Aho-Corasick automaton that detects all the keywords. It will be understood that in implementations that use other keyword matching algorithms, different setup for using the algorithm may be used. At 612, predefined patterns for sensitive data types that are to be detected are assembled into a collection of patterns. In some implementations, these patterns are represented by regular expressions. At 614, predefined validation functions for sensitive data types that are to be detected are assembled into a collection of validation functions. It will be understood that assembling the validation functions at 614 is optional in some implementations.

The detection portion 604 uses the information prepared in the setup portion 602 to detect sensitive data in input text. The inputs to the detection portion includes the input text in which the sensitive data is to be detected, along with the Aho-Corasick automaton (or other keyword detection setup information) and the collections of patterns and validation functions that were prepared in the setup portion 602. The outputs of the detection portion 604 include a list of positions within the input text at which sensitive data was detected, and a list of labels indicating the sensitive data types detected in each of these positions.

At 630, a keyword match is performed to identify possible ranges of characters in the input text at which sensitive data might appear, as well as the types of sensitive data associated with the keywords found in the possible ranges. In some implementations, the keyword match is performed by running or traversing the Aho-Corasick automaton prepared in the setup portion 602. Next, at 632, the ranges of characters identified by the keyword matching are matched against patterns (from the collection of patterns assembled in the setup portion 602) associated with the sensitive data types detected in these positions. This results in a list of positions that matched the patterns. In some implementations, matching the patterns includes matching regular expressions that are used to define the patterns. At 634, validation functions are run on the positions that matched the patterns to validate that the sensitive data in these positions have been properly identified. The positions that pass the validation functions will be reported as containing sensitive data. In some implementations this validation may be optional.

It will be understood that in addition to detecting sensitive data, the disclosed technology could be used in other applications, such as in information retrieval applications. For example, meaningful or relevant pieces of text inside larger text streams or files could be identified and/or extracted using the disclosed technology. Additionally, it will be appreciated that although the sensitive data detection is illustrated as applying to text, the disclosed technology may be applied to other types of media, such as audio, video, and/or images. For example, to detect sensitive information in audio, the audio may be converted to text, and an implementation of the disclosed technology could be used to detect sensitive and/or meaningful data in the resulting text. Similar methods could be used with other media. Additionally, in some implementations, there may be no need to reduce the media to text, since it will be understood by those of ordinary skill in the art that the disclosed technology could be modified to be directly applied to other types of data and/or media.

It will also be understood that, although the embodiments presented herein have been described with reference to specific features and structures, various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. An apparatus comprising:
   a processor;
   a memory coupled to the processor; and
   a sensitive data detector in the memory and executed by the processor, the sensitive data detector comprising:
     a keyword matcher, executed during a first stage of the sensitive data detector, that matches predetermined keywords in input text, and determines text in vicinities of matched keywords in the input text in which sensitive data is likely to be found, wherein the keyword matcher comprises a pre-constructed automaton configured to match the predetermined keywords in a single pass over the input text; and
     a pattern matcher, executed during a second stage of the sensitive data detector, that receives input from the keyword matcher and matches predefined patterns associated with sensitive data to the text in vicinities of matched keywords to detect sensitive data; and
     a validator, executed during a third stage of the sensitive data detector, that selects a checksum to apply based on a sensitive data type identified by the pattern matcher and applies the checksum to validate the sensitive data detected by the pattern matcher;
   wherein the keyword matcher executes prior to the pattern matcher; and
   wherein the text in vicinities of matched keywords is substantially shorter in length than the input text.

2. The apparatus of claim 1, wherein the keyword matcher has a time complexity that does not depend on how many predetermined keywords are to be matched.

3. The apparatus of claim 1, wherein the pre-constructed automaton is an Aho-Corasick automaton.

4. The apparatus of claim 1, wherein the predefined patterns comprise regular expressions.

5. The apparatus of claim 4, wherein the pattern matcher comprises a regular expression matching algorithm.

6. The apparatus of claim 1, wherein at least one of the keyword matcher or the pattern matcher comprises at least one of pre-processing or post-processing.

7. A method of detecting sensitive data on a computing device, the method comprising:
   receiving a set of predetermined keywords;
   generating, based on the set of predetermined keywords, an automaton configured to match the predetermined keywords in a single pass over input data;
   matching, by executing the automaton on the computing device, keywords in the input data, to determine data in vicinities of matched keywords in the input data in which sensitive data is likely to be found;
   matching, on the computing device, predefined patterns associated with sensitive data to the data in vicinities of matched keywords to detect sensitive data; and
   selecting, based on a sensitive data type identified for the detected sensitive data, a checksum;
   applying the checksum to the detected sensitive data to validate the detected sensitive data;
   wherein matching the predetermined keywords occurs prior to matching the predefined patterns; and
   wherein the data in vicinities of matched keywords is substantially shorter than the input data.

8. The method of claim 7, wherein matching the predetermined keywords has a time complexity that does not depend on how many predetermined keywords are to be matched.

9. The method of claim 7, wherein the automaton comprises a pre-constructed Aho-Corasick automaton.

10. The method of claim 9, wherein the set of predetermined keywords comprises a list of keywords that frequently co-occur with sensitive data for sensitive data types that are to be detected.

11. The method of claim 10, further comprising assembling the list of keywords using keywords from a plurality of virtual detectors, each virtual detector in the plurality of virtual detectors including at least one keyword associated with at least one sensitive data type.

12. The method of claim 7, wherein matching the predefined patterns comprises matching regular expressions.

13. The method of claim 7, wherein at least one of matching the predetermined keywords or matching the predefined patterns comprises applying at least one of pre-processing or post-processing.

14. The method of claim 7, wherein the input data comprises at least one of text, video, audio, or images.

* * * * *